United States Patent [19]
Scott

[11] Patent Number: 4,763,234
[45] Date of Patent: Aug. 9, 1988

[54] ILLUMINATED DEVICES

[76] Inventor: Peter S. Scott, 11 Pebble Beach Drive, Runaway Island, Queensland, 4216, Australia

[21] Appl. No.: 55,065

[22] Filed: May 28, 1987

[30] Foreign Application Priority Data

May 29, 1986 [AU] Australia .............................. PH6160

[51] Int. Cl.⁴ .............................................. F21V 9/00
[52] U.S. Cl. .................................. 362/293; 362/351; 340/107; 340/145
[58] Field of Search ................. 362/61, 80, 351, 293, 362/19; 340/124, 144, 145, 107

[56] References Cited

U.S. PATENT DOCUMENTS

| | | | |
|---|---|---|---|
| 2,230,262 | 2/1941 | Pollack | 362/61 |
| 3,905,017 | 9/1975 | Samra | 362/80 |
| 4,067,128 | 1/1978 | Kempster | 40/532 |
| 4,214,683 | 7/1980 | Wills et al. | 362/61 |
| 4,297,675 | 10/1981 | Rubottom et al. | 362/61 |
| 4,602,320 | 7/1986 | Tomkin et al. | 340/97 |
| 4,607,444 | 8/1986 | Foster | 40/550 |
| 4,660,128 | 4/1987 | Bergin et al. | 362/61 |

Primary Examiner—Charles J. Myhre
Assistant Examiner—David A. Okonsky
Attorney, Agent, or Firm—Foley & Lardner, Schwartz, Jeffery, Schwaab, Mack, Blumenthal & Evans

[57] ABSTRACT

A signal lamp having a housing in which a source of light is mounted, with the support surface being mounted in front of the light source. The support surface comprises the face plate of the signal lamp and has mounted thereon a pattern, symbol, or indicia which is displayed for the attention of an observer when the light source is inoperative. The pattern, symbol or indicia is of such a thickness that it reflects ambient light so as to be readable when the light source is inoperative, but thin enough to transmit the light field of the lamp so that the pattern, symbol or indicia is obscured when the light source is activated.

8 Claims, 1 Drawing Sheet

ILLUMINATED DEVICES

This invention relates to lighting systems and illuminated devices, and in particular to lighting comprising a visible display which may be selectively swamped by a luminous field. The invention has application in the operation of car and other like vehicle lamps, where stop lights, for instance, may display a sign, etc., when switched off, but function normally as a red brake signal when switched on.

In the field of motor vehicles, it is becoming common for vehicles such as cars to be provided with eye level stop lights. Usually, these are mounted upon a vehicle's rear window sill to be seen from behind through the rear window. The advantage of this disposition is that the eye level mounting makes the operation of the brake light more obvious to a following motorist, and accident statistics indicate that the rate of rear end collisions is reduced when use is made of eye level stop lighting. It is quite usual to provide stickers etc. on rear windows as the effectiveness of this as advertising is enhanced for the same reason that eye level brake lights are effective; the sticker is more easily seen at eye level.

It is an object of the present invention to provide a form of lighting which incorporates a sign, motif, decorative pattern, etc. which is visible in one state of the illuminated device but not visible in another. In its application to vehicle brake lights, for example, the invention allows an eye level brake light to fulfill a dual role, as a fully functional brake light, as well as a means whereby intelligible, or other visual imagery may be displayed via the light face. Other objects and advantages of the invention will be hereinafter made apparent.

The invention achieves its objects in the provision of an illuminated device comprising:

a source of light by which a light field may be selectively generated through activation of a switching mechanism operable to switch a supply of power to the light source;

a support surface whereon one or more of a pattern, symbol or indicia may be displayed for the attention of an observer;

the support surface being disposed in operative relationship with respect to the source of light whereby any pattern, symbol or indicia thereon is visible when the light source is inoperative and obscured when the light source is activated.

The invention will now be described with reference to a preferred embodiment which is shown in the accompanying drawings in which.

Figure 1:
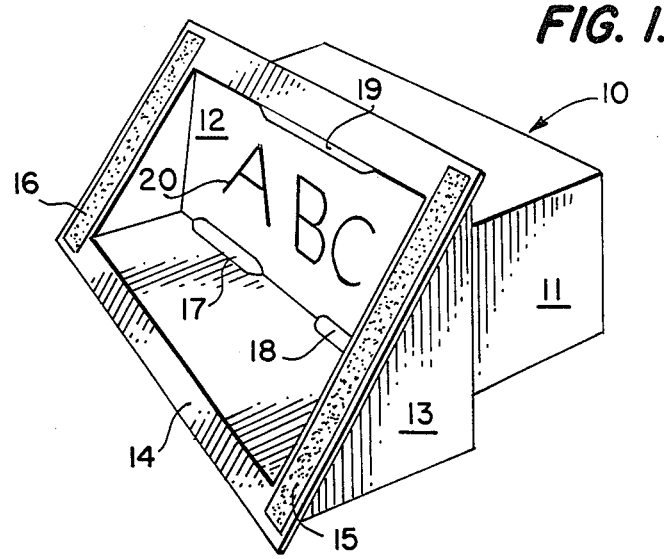
FIG. 1 is a perspective view of an embodiment of the present invention.

In application of the invention to a brake light, for example, the source of light may be the usual incandescent source within a suitable housing behind a cover plate which may comprise the usual diffuser employed so as to produce a uniform luminous field across the surface area of the visible signalling surface of the illuminated device or lighting system, and the carrier may be a screen printed sticker, adhesively overlaid on the front surface of the lamp to be illuminated from behind by the light's luminous field so that, in the on state, the screen printing on the sticker is not visible and does not interfere with the operation of the device as a stop light, or other such functional signallying light. Upon switching off the light, the screen printing may then be visible. This combination enables provision of an eye level brake light which combines therewith the display of any desired message, decoration, trade name, mark, etc., so as to enable a hitherto unrealised dual purpose.

A brake light of the above character can be advantageously formed in a case which may be directly applied to the inside surface of a motor vehicle rear window to achieve a very convenient eye level mounting which merely requires to be wired up to the car's brake light circuit. As a means of mounting, a doube sided tape of the type which is now quite common, and possesses good adhesive qualities with respect to materials such as plastic and glass, is advantageously utilised. The lamp may be a lightweight construction which does not require any more than a good quality adhesive, attached at one side of a tape to the case of a lamp with a removable cover patch over the adhesive on the other side to enable packaging and distribution. The cover strip need only be peeled off, and the lamp pushed against the rear window glass at a desired location, to effect mounting. This manner of mounting puts the brake light up close to the glass, to overcome any reflection problems arising out of reflections off the inside surface of the rear window glass which would cause interference with the driver's clear view out the rear window when the brakes are applied after dark when the intensity of any reflection might otherwise be significant.

The above described eye level brake light may be a moulded form, produced in parts to be assembled, formed of any heat resistant material for the case or body for support of a light source therein, which may be vented so as to not result in overheating of incandescent bulb or bulbs, and a prismatic or other type diffuser sheet over its front face to produce a uniform light field. So as to enable mounting therein of words, symbols etc., it is preferred to employ a screen printing process to apply an ink or other suitable medium to the front of the diffuser or an adhesive backed sheet which may then be applied across the front of the brake light. This method enables production of lights with a display in front with full use of known and relatively economic techniques. The lamp front plate might be produced with an integral pattern, of visible character, directly applied to the plastic, but then a more complex method of production may need to be employed which is not so readily varied to accommodate a new display as can be the case with screen printed diffusers or stickers.

In FIG. 1, illuminated device 10 has a light box 11 which is opaque and enclosed on all but its forward face, whereat a face plate support surface 12 is mounted. The support surface may be a red tinted, translucent, moulded plastic, having the usual ribbed structure commonly employed in brake lights so as to create a uniformly focussed light field from one or more light bulbs. The support surface 12 is surrounded by a shroud 13 having a rim 14 which is able to be pressed against the inside surface of a vehicle rear window to orient the support surface appropriately for sighting by following motorists. So as to hold the illuminated device in place against the glass surface, adhesive strips 15 and 16 may be provided. The adhesive strips may be a double sided tape having a removable protective layer thereon that may be peeled off when the illuminated device is to be fitted in place. The support surface 12 may be produced separately from the housing 11 and it may be a press fit thereagainst, being retained by lips 17, 18 and 19, behind which it is positioned in use by press fitting. Any pattern, symbol or indicia 20 may be provided on support surface 12 by a means such that, when the device is lit, the pattern, symbol or indicia is not viewable. A thin, silk screen printing over a red lighted base serves the purpose of the invention.

Figure 2:
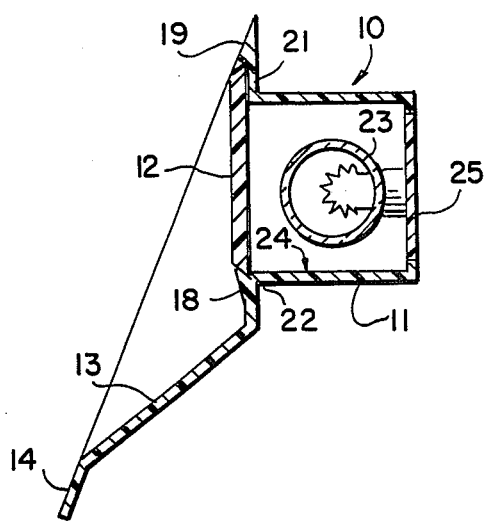
FIG. 2 is a transverse section through the device of FIG. 1.

In FIG. 2 is shown a sectional view transversely through the illuminated device of FIG. 1. Light box 11 may have one or more light bulbs or tubes therein, and a bulb 23 is shown mounted off the rear wall 25 of the light box 11. The rear wall may be removable to gain access to the light bulb so that it might be changed when blown. This is faciliated by arranging the bulb sockets and their wiring in a mounting means attached to the removable rear wall 25. The inside surface 24 of the light box 11 may be silvered and this is conveniently arranged by spraying a coating on the inner surface. The light box 11, and shroud 13, may be a plastic moulding, and a black plastic is preferred for its opaque qualities. In order that the support surface 12 be simply fitted to the front face of light box 11, a press fitting is established with tapered upper and lower edges of support surface 12 forced behind lips such as 18 and 19 in FIG. 2.

The above described device serves as a driver, eye level, warning lamp which is operated in tandem with the more usual vehicle brake lights. When not operable, the support surface of the brake light becomes a surface on which may be carried some pattern etc. such as company name, logo, message, advertising, etc.

It will be clear from the above, that the pattern, symbol, or indicia may be provided on the surface of other vehicle lamps or as a form of display in other situations.

In providing a screen printing sticker, a translucent or transparent material may be employed which is effective as a red filter so that a white light is caused to show up red as required of a brake light. The screen printed information may be applied thereover in a white or yellow screen printing medium. The base material for the printed sticker may be an adhesive backed film of the type which is provided with a cover sheet over the adhesive layer, which is removed and discarded prior to application over its support. Such a material may be a thin self adhesive vinyl film. In operation, activation of a means of generating a field of white light behind such a red film will cause the film to pass a red light field which will be effective to swamp the screen printed, white or yellow display thereover.

In arrangements such as the above, should the degree by which the displayed material be swamped upon activation of the illuminating light field prove to be inadequate in a particular application, then various provisions may be made in the display to assist the uniform distribution of diffused illuminating light and improve the effectivenss of the arrangement's operation. Where large opaque areas may exclude too much of the light field, the printing of those areas might be effected in a half screen mode so as to be readily viewable in reflected light but partially transmissive to light from behind, so that the overall effect is preserved. The selection of materials, and frequency of transmitted light, may enable use of an overlay of information which is transparent to the frequency of light to be transmitted but which is reflective in at least one of the frequencies in the natural white light that normally enables the display to be seen.

By use of the above techniques, motor vehicle lights may be provided with badges, logos etc., in a way which does not affect their operation as a light. As applied to an eye level brake light, the twin objectives, brake indication and effective advertisement, may be accommodated in a single unit. It will be clear that whilst the above arrangements have applications to vehicle brake lights, the invention might be more broadly applied as a visual display where information to be displayed may be switched on and off in an eyecatching manner. A white or yellow medium may be simply silk screened directly onto a support and may be directly applied to a lamp diffuser plate. Stickers might be produced for application to existing lamps, either for interior or exterior by mounted lights. The way in which the information to be displayed is physically applied or supported in a light field may be varied so as to achieve the separate objects of uniform field in one state and patterned field in another, so that a display may be intermittently effected. What are now provided as bumper stickers might be mounted over a vehicle light.

In construction of a case for a light of the above character, a display comprised of a word may require an elongate structure which is not readily uniformly illuminated by an incandescent bulb if a thin structure is to be provided, and a number of bulbs may be provided along the length of the case so as to assist in the generation of a uniform light field. Alternatively, a strip source such as flourescent tube might be utilised. The means by which a uniform light field may be generated in any particular shape will be clear to those skilled in optical engineering and it will be clear that variations may be made within the scope and field of the invention herein set forth.

The claims defining the invention are as follows:

1. A signal lamp comprising:
   (a) a housing,
   (b) a source of light mounted in said housing and by means of which a light field may be selectively generated through activation of a switching mechanism operable to switch a supply of power to the light source, and
   (c) a support surface mounted in front of said light source, said support surface comprising the face plate of the signal lamp and having mounted thereon a pattern, symbol, or indicia which is displayed for the attention of an observer when said light source is inoperative, and
   wherein the pattern, symbol, or indicia is provided in a thickness such as to reflect ambient light while being thin enough to transmit the light field of the signal lamp whereby the pattern, symbol, or indicia is visible when the light source is inoperative and obscured when the light source is activated.

2. A signal lamp as claimed in claim 1, wherein said face plate is translucent to enable back-lighting, and said pattern, symbol or indicia comprises a silk screened image thereon.

3. a signal lamp as claimed in claim 1, wherein said housing and face plate form part of a motor vehicle signal lamp.

4. A signal lamp as claimed in claim 1, wherein said face plate is red tinted and forms part of a vehicle stop light, and said pattern, symbol or indicia is a silk screened, white colored image.

5. A signal lamp as claimed in claim 1, wherein said pattern, symbol or indicia is provided upon a transparent, adhesive backed material which is adhered to said face plate.

6. A signal lamp as claimed in claim 1, further including a shroud extending around and supporting said face plate, said shroud being formed with a rim having an angular orientation corresponding to the orientation of the rear window of a vehicle, and adhesive contact means provided on said rim for bonding said rim to said window.

7. The signal lamp of claim 6, wherein said housing and said shroud are integrally molded in one piece.

8. The signal lamp of claim 6, wherein said housing is opaque and said face plate is mounted by press fitting behind lips formed on said shroud at the front of said housing.

* * * * *